US012583164B2

(12) United States Patent
Ortiz-Grob et al.

(10) Patent No.: US 12,583,164 B2
(45) Date of Patent: Mar. 24, 2026

(54) MULTILAYER ARTICLES AND METHODS OF MAKING

(71) Applicant: Flex Films (USA) Inc., Elizabethtown, KY (US)

(72) Inventors: David Ortiz-Grob, Elizabethtown, KY (US); Steven Sargeant, Elizabethtown, KY (US); Dakota Goodman, Elizabethtown, KY (US)

(73) Assignee: Flex Films (USA), Inc., Elizabethtown, KY (US)

( * ) Notice: Subject to any disclaimer, the term of this patent is extended or adjusted under 35 U.S.C. 154(b) by 215 days.

(21) Appl. No.: 18/264,998

(22) PCT Filed: Feb. 9, 2022

(86) PCT No.: PCT/US2022/015730
§ 371 (c)(1),
(2) Date: Aug. 10, 2023

(87) PCT Pub. No.: WO2022/173778
PCT Pub. Date: Aug. 18, 2022

(65) Prior Publication Data

US 2024/0308124 A1 Sep. 19, 2024

Related U.S. Application Data

(60) Provisional application No. 63/147,994, filed on Feb. 10, 2021.

(51) Int. Cl.
*B29C 48/00* (2019.01)
*B29C 48/18* (2019.01)
(Continued)

(52) U.S. Cl.
CPC .......... *B29C 48/023* (2019.02); *B29C 48/185* (2019.02); *B29K 2023/12* (2013.01);
(Continued)

(58) Field of Classification Search
None
See application file for complete search history.

(56) References Cited

U.S. PATENT DOCUMENTS

| | | | |
|---|---|---|---|
| 7,122,239 | B2 | 10/2006 | Bennett et al. |
| 2016/0152009 | A1 | 6/2016 | Jenkins et al. |

(Continued)

FOREIGN PATENT DOCUMENTS

| | | | |
|---|---|---|---|
| EP | 3750682 | A1 | 12/2020 |
| JP | H09-254231 | A | 9/1997 |

(Continued)

OTHER PUBLICATIONS

International Search Report and Written Opinion dated May 11, 2022, pertaining to Int'l Application No. PCT/US2022/015730, 12 pgs.

(Continued)

*Primary Examiner* — Samir Shah
(74) *Attorney, Agent, or Firm* — Dinsmore & Shohl LLP

(57) ABSTRACT

Embodiments of multilayer articles and methods of producing multilayer articles are disclosed. The multilayer articles include a stack $(A-B)_n$ of n layer units A-B, where n is greater than or equal to 64, each layer unit A-B comprising a first nanolayer A and a second nanolayer B overlying the first nanolayer A. The first nanolayer A of the layer units comprises a heterogeneous blend. The second nanolayer B of the layer units comprising a homogeneous material.

16 Claims, 3 Drawing Sheets

(51) Int. Cl.
*B29K 23/00* (2006.01)
*B29K 67/00* (2006.01)

(52) U.S. Cl.
CPC *B29K 2067/003* (2013.01); *B29K 2995/0026* (2013.01); *B29K 2995/0053* (2013.01); *B29K 2995/0097* (2013.01)

(56) References Cited

U.S. PATENT DOCUMENTS

| | | | | |
|---|---|---|---|---|
| 2017/0120495 | A1* | 5/2017 | Jenkins | B32B 27/08 |
| 2020/0048387 | A1* | 2/2020 | Takeshita | C08F 216/06 |
| 2020/0215801 | A1* | 7/2020 | Hannig | B32B 27/36 |

FOREIGN PATENT DOCUMENTS

| | | | |
|---|---|---|---|
| JP | 2008265092 | A | 11/2008 |
| JP | 2018030901 | A | 3/2018 |
| WO | 2021026204 | A1 | 2/2021 |

OTHER PUBLICATIONS

Japanese Office Action dated Dec. 2, 2025, pertaining to JP Patent Application No. 2023-548766, 12 pgs.

Canadian Office Action dated Jan. 19, 2026, pertaining to CA Patent Application No. 3,211,044, 5 pgs.

* cited by examiner

MULTILAYER ARTICLES AND METHODS OF MAKING

CROSS-REFERENCE TO RELATED APPLICATION

This application is a National Phase Entry under 35 U.S.C. § 371 of International Patent Application No. PCT/US2022/015730 filed Feb. 9, 2022, which claims priority to U.S. Provisional Application No. 63/147,994, filed Feb. 10, 2021, the entireties of which are incorporated herein by reference.

TECHNICAL FIELD

Embodiments of the present disclosure generally relate to polymeric articles and, more specifically, to multilayer articles.

BACKGROUND

Polymeric multilayer articles are well known in the art. Such materials are commonly used in the construction of flexible packaging, solar control window films, substrates for electronics manufacture, and a host of other significant and valuable uses. Manufacturers have actively pursued the production of substantial commercial quantities of these plastic materials due to performance and cost advantages afforded by the technology.

Polymers and resins used to manufacture such articles can come from many commercial sources. Polymers and resins are chain like materials with many repeating units as is well known in the art. For instance, through the conversion of petroleum sources such as in the case of polyester, nylon and polycarbonate materials, the conversion of natural gas sources such as in the case of polyethylene, polypropylene, butadienes and other materials, natural processes such as in the case of carbohydrate polymers like cellulose derivatives, starch derivatives, polylactic acid, and polyethylene furonate. Furthermore, combinations of material sources are also use to produce thermoplastic resinous materials as a methodology to balance cost and supply issues.

SUMMARY

Plastic waste streams contain a multitude of plastics. There are many commercially-available products on the market that contain various different polymers within the structures. Although separation process technologies are improving, there are still many instances of products with a mixture of various polymeric materials that cannot be recycled after consumers introduce the products into the recycling streams.

An example of such products that have difficulty being recycled include multi-material flexible film packaging. The Sustainable Packaging Coalition explains that bales made out of multi-material flexible film packaging are very difficult to process into consistent quality products due to the uncertainty of their overall material makeup. The Association of Plastic Recyclers see a similar issue with incompatible polymers in their recycle streams. Therefore, separations methods are commonly employed, such as separating polymers that float and polymers that sink in a hot water bath. This form of separation targets labels made of polyolefins and separates them from the higher density polyester packaging that sinks. However, PET and polyolefins are incompatible such that any mixing of materials in this separation process will often result in poor quality recycled goods.

Accordingly, there are needs for polymeric articles such as films, sheets, and pellets that utilize polymer blends that do not result in poor quality articles, for example, by sacrificing attributes like gas barrier and thermal resistance. In particular, there are needs for polymeric articles that utilize recycled polymer blends that do not result in poor quality articles.

Embodiments of the present disclosure meet those needs by providing extruded polymer articles that include a nanolayered stack with a heterogeneous layer comprising an immiscible polymers. In embodiments, the polymer materials may come from sources including post-consumer recycle (PCR) and post-industrial recycle (PIR) waste streams. In embodiments, the nanolayering of the heterogeneous layer may imbed the immiscible particles in a melt stack between two homogenous layers. Although, not wishing to be bound by any particular theory, nanolayering may allow for reduced particle sizes within the heterogeneous layer, while the homogenous layers add structure. Together, the two layers of the melt stack structure may allow for reduced defect propagation, which may result in higher melt strength during extrusion and post processing. Accordingly, the multilayer articles and methods of producing described herein may allow for post-consumer recycle (PCR) and post-industrial recycle (PIR) materials to be recycled into a multilayer, polymeric structure.

Embodiments of this disclosure are directed to multilayer articles and methods of producing multilayer articles. The multilayer article may include a stack $(A\text{-}B)_n$ of n layer units A-B, where n is greater than or equal to 64, each layer unit A-B comprising a first nanolayer A and a second nanolayer B overlying the first nanolayer A. The first nanolayer A of the layer units may comprise a heterogeneous blend. The second nanolayer B of the layer units may comprise a homogeneous material.

DETAILED DESCRIPTION

Embodiments of this disclosure include multilayer articles. The multilayer articles include a stack $(A\text{-}B)_n$ of n layer units A-B, where n is greater than or equal to 64, and each layer unit A-B includes individual layers comprising a first nanolayer A and a second layer B overlying the first layer A. The first nanolayer A of each layer unit comprises a heterogeneous blend. The second layer B of each layer unit comprises a homogeneous material. In one or more embodiments, the multilayer article may be a thermoplastic multilayer article.

The term "comprising" is used in the present description and claims as an open-ended term that does not exclude other non-specified elements. Unless specified otherwise, the terms "including" and "having" are equivalent to "comprising".

As used in the specification and appended claims, singular nouns preceded by an article "a," "an," or "the" are to be understood as inclusive of the plural forms, unless the context clearly indicates otherwise.

All numerical ranges of this disclosure, for example "from 1 to 10" are to be understood as disclosing all individual values in the ranges, as well as all subranges in the ranges, as separate embodiments. For example, the range "from 1 to 10" discloses as separate embodiments every individual value from 1 to 10, inclusive of 1 and 10, as well as subranges including, but not limited to "from 5 to 10", "from 2 to 8", "from 5 to 8" and "from 3 to 9".

Figure 1:
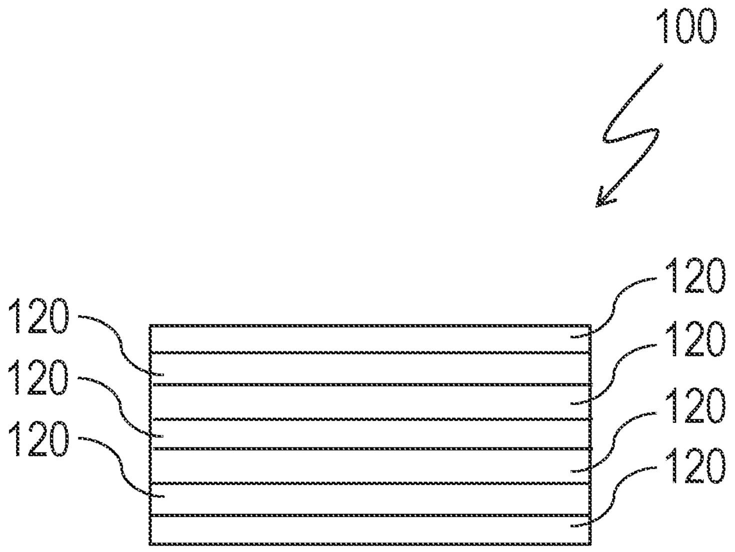
FIG. 1 is an illustrative embodiment of a stack according to one or more embodiments of this disclosure.

In embodiments, the multilayer article includes a stack $(A\text{-}B)_n$ of n layer units A-B. FIG. 1 provides an illustration of the stack $(A\text{-}B)_n$, where the stack 100 includes n number of layer units 120. In embodiments, there may be at least 64 layer units A-B. In further embodiments, there may be greater than or equal to 64 layer units A-B, greater than or equal to 250 layer units A-B, greater than or equal to 500 layer units A-B, or greater than or equal to 1000 layer units A-B. In some embodiments, n is from 512 to 2048, from 512 to 1024 or from 1024 to 2048. For example, when subscript n of $(A\text{-}B)_n$ is 512, and there is only a first nanolayer A and a second nanolayer B in the unit A-B, then the stack will comprises 1024 individual layers, in which there is an ABAB repeating pattern. In one or more embodiments, the unit A-B comprises three layers, such the stack has a repeating pattern of ACB, AAB, or ABB, in which C is an additional heterogeneous blend or homogenous material.

Without being bound by theory, including at least 64 layers may allow at least one of the layers to approach the nanolayer domain size noted below and also be extrudable on conventional equipment.

In one or more embodiments, the stack 100 may have an overall thickness of at least 100 nanometers (nm), at least 500 nm, at least 1000 nm, or at least 1500 nm.

Figure 2:
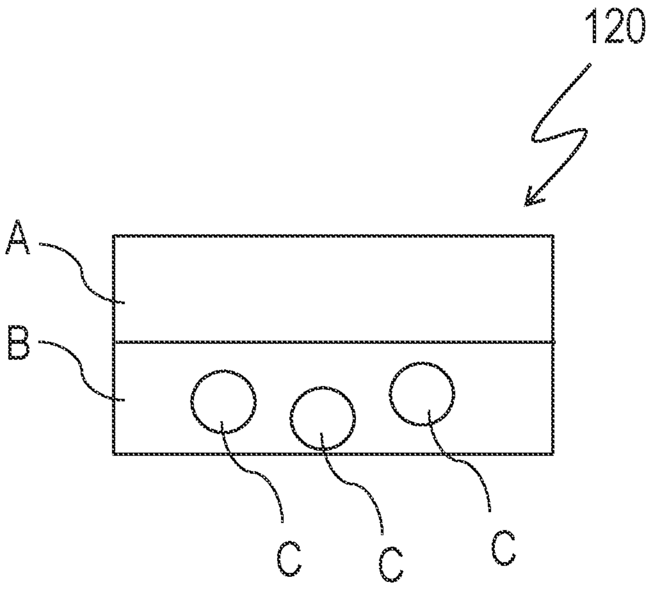
FIG. 2 is an illustrative embodiment of a unit according to one or more embodiments of this disclosure.
Figure 3:
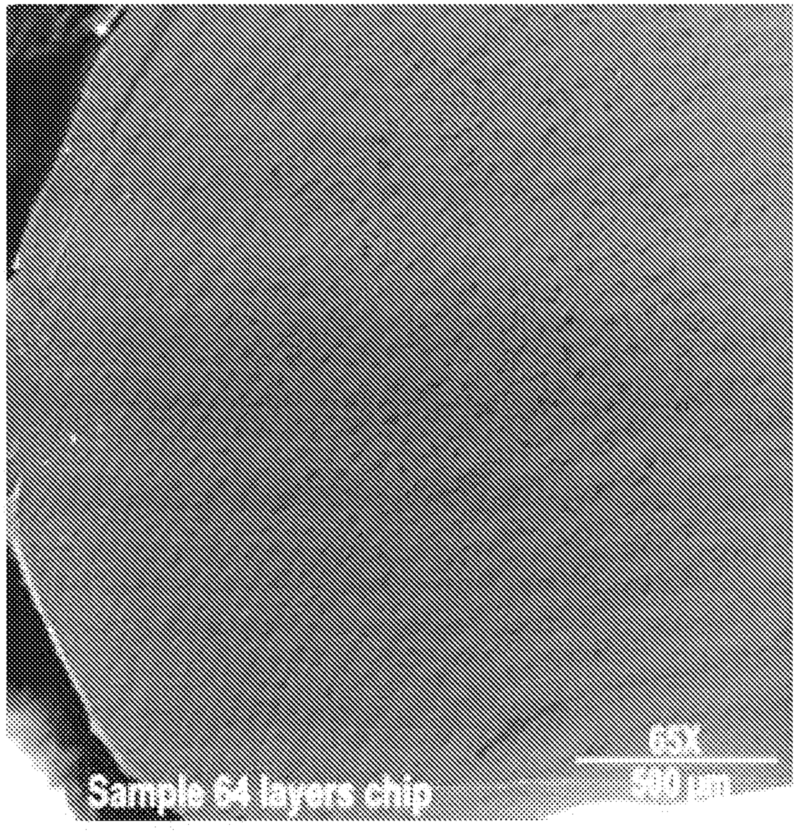
FIG. 3 is an image of a sample multilayer article comprising 64 layers according to one or more embodiments of this disclosure.
Figure 4:
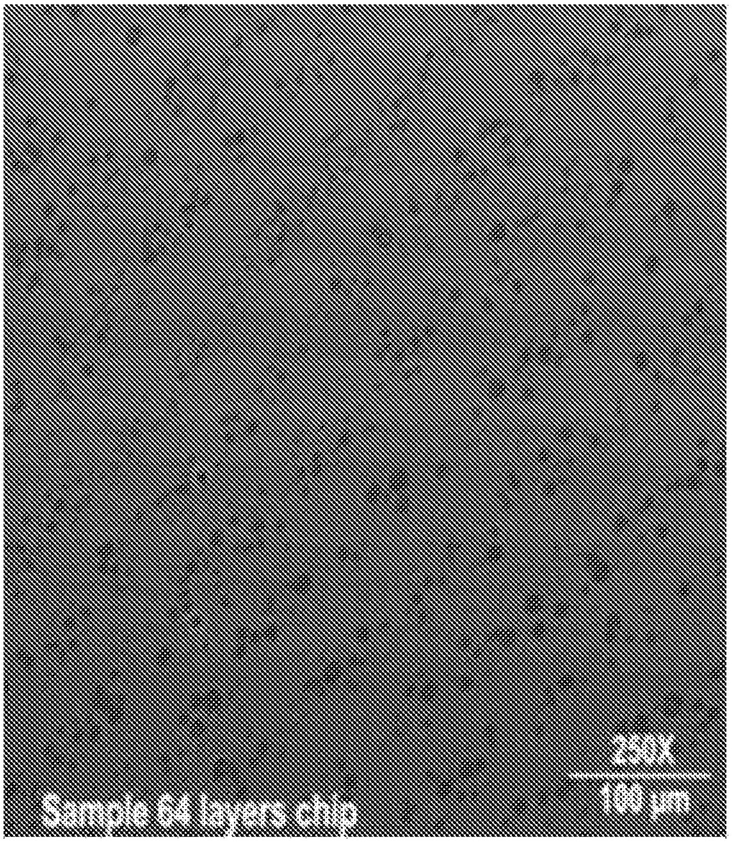
FIG. 4 is an image of a sample multilayer article comprising 64 layers according to one or more embodiments of this disclosure.

FIG. 2 provides an illustration of a layer unit 120. Each layer unit 120 includes a first nanolayer A and second nanolayer B. In one or more embodiments, at least one nanolayer A or nanolayer B may of the stack 100 may have a thickness of from 50 nm to 200 nm. In embodiments, the individual layers of the stack 100 may have varying thicknesses or the same thickness. As used herein, nanolayer A may also be referred to layer A, and nanolayer B may also be referred to as layer B. In embodiments, the second nanolayer B overlies the first nanolayer A. In one or more embodiments, a ratio of a thickness of the first nanolayer A to a thickness of the second nanolayer B is from 90:10 to 10:90 or from 80:20 to 20:80.

Nanolayer A may comprise a heterogeneous blend. As used herein, a "heterogeneous blend" means a mixture having a non-uniform composition that includes two or more polymeric materials. In embodiments, the heterogeneous blend may include a blend of at least two polymer materials chosen from a homopolymer, a copolymer, a terpolymer of a $C_2$ to $C_8$ $\alpha$-olefin, a polyamide, a polyacetate, a polyester, a polycarbonate, a polystyrene, a poly(vinyl chloride), a poly(ethylene vinyl alcohol), a poly(ethylene vinyl acetate), a poly(acrylic acid) and a poly(ethylene terephthalate) or combinations of any of the foregoing materials. In some embodiments, the heterogeneous blend comprises a polypropylene homopolymer or polypropylene-based copolymer. In some embodiments, the heterogenous blend comprises a polyethylene homopolymer or polyethylene-based copolymer (e.g. an LLDPE). In some embodiments, heterogeneous blend comprises polyethylene terephthalate (PET). In some embodiments, the heterogeneous blend comprises polybutylene terephthalate (PBT).

The polymers used to manufacture nanoayer A can come from many commercial sources. In some embodiments, the polymers to manufacture nanoayer A may include one or more of virgin materials, post-consumer recycle (PCR) materials, and post-industrial recycle (PIR) materials. As used herein, virgin materials mean a raw material that has not been recycled. As used herein, Post-Consumer Resin (PCR) is a polymer material that has been re-processed to be re-used in new manufacturing and comprises a recycled resin or blend of recycled resins that would have otherwise become waste. PCR materials have been reclaimed after leaving the hands of the consumer. As used herein, Post Industrial Resin (PIR) is polymeric waste recovered from industrial processes and comprises a recycled resin or a blend of recycled resins that would have otherwise become industrial waste. In contrast to PCR, PIR is recycled polymeric material that never left the manufacturing floor (and therefore never made it to the consumer).

In embodiments of the multilayer article, the heterogeneous blend further includes one or more additional polymers immiscible with a first polymer.

Referring still to FIG. 2, the one or more additional polymers immiscible with the first polymer may include hydrocarbon-based polymers like polystyrene, polyolefins and the alike, which are not miscible in the first polymer and imbed immiscible particles C in the first polymer of nanolayer A. For example, in embodiments, the first polymer may be PET and the one or more additional polymers immiscible with the first polymer may be one or more hydrocarbon-based polymers like polystyrene, polyolefins.

In one or more embodiments of the multilayer article, the one or more additional polymers immiscible with the first polymer may include one or more cycloolefin polymers. The cycloolefin polymers may be homopolymers or copolymers that contain polymerized cycloolefin units and, optionally, acyclic olefin comonomers. Suitable cycloolefin polymers include 0.1% to 100% by weight cycloolefin units, or from 10% to 99% by weight cycloolefin units, or from 50% to 95% by weight cycloolefin units, based in each case on the total mass of the cycloolefin polymer. In some embodiments, the cycloolefin polymers may have a structure according to any one of Formulas I, II, III, IV, V, or VI:

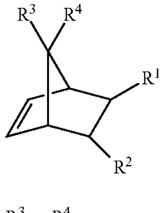

(I)

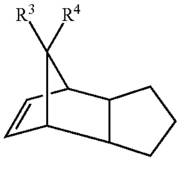

(II)

-continued (III)

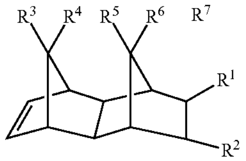

(IV)

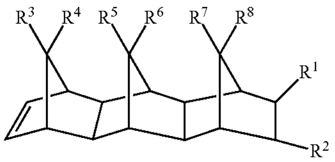

(V)

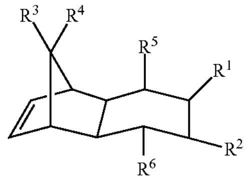

(VI)

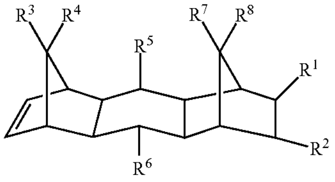

In formulas (I), (II), (III), (IV), (V), and (VI), $R^1$, $R^2$, $R^3$, $R^4$, $R^5$, $R^6$, $R^7$ and $R^8$ are identical or different and independently of one another denote a hydrogen atom or a $(C_1\text{-}C_{30})$hydrocarbyl. The term "hydrocarbyl" refers to a hydrocarbon radical. Optionally, any two or more of the radicals $R^1$ to $R^8$ in any of formulas I-VI may be joined cyclically to one another. Examples of $(C_1\text{-}C_{30})$hydrocarbyl radicals include linear or branched $(C_1\text{-}C_8)$alkyl, $(C_6\text{-}C_{18})$ aryl, $(C_7\text{-}C_{20})$alkylenearyl, and $(C_3\text{-}C_{20})$cycloalkyl. The term "alkyl" refers to a branched alkane radical or an unbranched alkane radical. The term "aryl" refers to an aromatic ring structure having a radical on a carbon atom of the aromatic ring. The term "alkylenearyl" refers to a alkyl-aromatic structure having a radical on a carbon of the alkyl group.

The cycloolefin polymers may contain from 0% to 45% by weight, based on the total mass of the cycloolefin polymer, of polymerized units of at least one monocyclic olefin of the formula VII:

(VII)

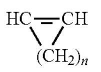

In formula (VII), n is an integer from 3 to 10.

The cycloolefin polymers may further contain from 0% to 99% by weight, based on the total mass of the cycloolefin polymer, of polymerized units of an acyclic olefin of the formula VIII:

(VIII)

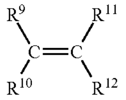

In formula (VIII), $R^9$, $R^{10}$, $R^{11}$, and $R^{12}$ are independently selected from a hydrogen atom (—H), $(C_1\text{-}C_{10})$hydrocarbyl, $(C_1\text{-}C_8)$alkyl, or $(C_6\text{-}C_{14})$aryl.

Likewise suitable in principle are cycloolefin polymers obtained by ring-opening polymerization of at least one of the monomers of the formulas I to VI and subsequent hydrogenation.

Cycloolefin homopolymers are synthesized from one monomer of any of the formulas (I) to (VI).

The fraction of polymerized units of acyclic olefins of the formula VIII is up to 99% by weight, from 5% to 80% by weight, or from 10% to 60% by weight, based on the total weight of the respective cycloolefin copolymer.

In various embodiments, the cycloolefin copolymers (COCs) include polymerized units of polycyclic olefins of formula (VIII), where one of $R^9$, $R^{10}$, $R^{11}$, and $R^{12}$ is a cyclohydrocarbyl with a norbornene parent structure of formula (I). In some embodiments, the COC includes polymerized units of norbornene or tetracyclododecene, formula (III), where $R^1$, $R^2$, $R^3$, $R^4$ $R^5$, $R^6$, and $R^7$ are hydrogen.

In other embodiments, the one or more additional polymers immiscible with the first polymer includes COCs containing polymerized units of acyclic olefins such as ethylene. In some embodiments, the one or more additional polymers immiscible with the first polymer includes norbornene/ethylene and tetracyclododecene/ethylene copolymers containing from 5% to 80% by weight ethylene units, or from 10% to 60% by weight ethylene units, based on the weight of the copolymer.

The COCs may include compounds prepared by heterogeneous or homogeneous catalysis with organometallic compounds, according to any known synthetic route. Suitable catalyst systems based on cocatalysts of titanium compounds and/or vanadium compounds in conjunction with aluminum organyls.

Polymers and resin blends may be compatible in some weight ratios and incompatible in others. Accordingly, selection of the first polymer or one or more additional polymers of the heterogeneous blend may utilize phase diagrams, thermal instrumentation, SEM, TEM, or other methods. For example, phase diagrams may be constructed to describe the complex behavior of polymeric blends over a concentration range of interest. Thermal instrumentation derived measurements across the blend ratios may show a single, a double, or more complex glass transition behaviors. Phase structures when examined by SEM or TEM may show complex dispersion characteristics not apparent under light microscopy.

In various embodiments, the heterogeneous blend comprises from 5 weight percent (wt. %) to 95 wt. % of the first polymer, based on the total weight of the heterogeneous blend. In one or more embodiments, the heterogeneous blend comprises from 5 wt. % to 90 wt. %, from 5 wt. % to 80 wt. %, from 5 wt. % to 70 wt. %, from 5 wt. % to 60 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 90 wt. %, from 10 wt. % to 80 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 90 wt. %, from 20 wt. % to 80 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 90 wt. %, from 30 wt. % to 80 wt. %, from 30 wt. % to 70 wt. %, from 30 wt. % to 60 wt. %, from 30 wt. % to 50 wt. %, from 30 wt. % to 40 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, from 80 wt. % to 90 wt. %, or from 90 wt. % to 95 wt. % of the first polymer, based on the total weight of the heterogeneous blend.

In various embodiments, the heterogeneous blend comprises from 5 weight percent (wt. %) to 95 wt. % of the one or more additional polymers, based on the total weight of the heterogeneous blend. In one or more embodiments, the heterogeneous blend comprises from 5 wt. % to 90 wt. %, from 5 wt. % to 80 wt. %, from 5 wt. % to 70 wt. %, from 5 wt. % to 60 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 90 wt. %, from 10 wt. % to 80 wt. %, from 10 wt. % to 70 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 90 wt. %, from 20 wt. % to 80 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 90 wt. %, from 30 wt. % to 80 wt. %, from 30 wt. % to 70 wt. %, from 30 wt. % to 60 wt. %, from 30 wt. % to 50 wt. %, from 30 wt. % to 40 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, from 80 wt. % to 90 wt. %, or from 90 wt. % to 95 wt. % of the one or more additional polymers, based on the total weight of the heterogeneous blend.

In some embodiments, the heterogeneous blend includes from 50% to 95% by weight of the first polymer and from 5% to 50% of the one or more additional polymers, based on the total weight of the heterogeneous blend. In further embodiments, the heterogeneous blend includes from 80% to 95% by weight of PET and from 5% to 20% of polyethylene, based on the total weight of the heterogeneous blend. In further embodiments, the heterogeneous blend includes from 80% to 95% by weight of PET and from 5% to 20% of COC, based on the total weight of the heterogeneous blend. In further embodiments, the heterogeneous blend includes from 80% to 95% by weight of PET and from 5% to 20% of polypropylene, based on the total weight of the heterogeneous blend.

Since the one or more additional polymers are immiscible with the first polymer of the heterogeneous blend, the one or more additional polymers may form voids within the first polymer, in which there is an absence of the first polymer. The voids formed from the one or more additional polymers that are immiscible with the first polymer of the heterogeneous blend become an intralayer void once the desired number of units A-B are formed. The multilayer article therefore include may intralayer voids within a portion of the individual layers in the stack. An intralayer void is a void that is confined to a single layer, such as the first nanolayer A or the second layer B or a single unit A-B. In one or more embodiments of the multilayer article, the intralayer voids may have heights greater than 0 and less than 0.4 μm. In some embodiments, the intralayer voids have heights greater than 0 and less than 0.3 μm. Without being bound by theory, when the height of the intralayer void in less than the wavelength range of visible light, it is believed that the multilayer article may have less bulk haze and, in turn, greater transmittance of visible light, than when the intralayer voids have a height greater than the wavelength range of visible light.

Nanolayer B may include a homogenous material. Without being bound by theory, nanolayer B, comprising the homogenous material, may provide structure and act as an adhesive layer. may be As used herein, a "homogeneous material" means a material that has the same composition throughout. In embodiments, the homogenous material may be a polymer chosen from a homopolymer, a copolymer, a terpolymer of a $C_2$ to $C_8$ α-olefin, a polyamide, a polyacetate, a polyester, a polycarbonate, a polystyrene, a poly (vinyl chloride), a poly(ethylene vinyl alcohol), a poly(vinyl alcohol), a poly(ethylene vinyl acetate), a poly(acrylic acid) and a poly(ethylene terephthalate). In some embodiments, the homogenous material comprises a polypropylene-based homopolymer or copolymer. In some embodiments, the homogenous material comprises a polyethylene-based homopolymer or copolymer (e.g. an LLDPE). In some embodiments, the homogenous material comprises polyethylene terephthalate (PET). In some embodiments, the homogenous material comprises polybutylene terephthalate (PBT). The polymer used to manufacture Layer B can come from many commercial sources.

In embodiments, the polymer of the homogenous material may be different from the first polymer and one or more additional polymers of the heterogeneous blend. In other embodiments, the polymer of the homogenous material may be the same as the first polymer or one or more additional polymers of the heterogeneous blend.

The heterogeneous blend, the homogenous material, or both may further include additives. Modification of the bulk polymeric materials is often done through compounding additives into the materials. For instance, compounding additives may be compounded or mixed with the heterogeneous blend, the homogenous material, or both to modify the properties of the heterogeneous blend or the homogenous material, respectively. In particular, compounding additives may control or modify surface properties of the heterogeneous blend or the homogenous material, respectively, after extrusion. Compounding additives may include silica, tale, clay, diatomaceous earth, glass beads and alike inorganic filler materials. The heterogeneous blend, the homogenous material, or both may include organic small molecule materials like antioxidants, UV stabilizers, colorants, hydrolysis control agents and many other low Dalton materials. The heterogeneous blend, the homogenous material, or both may further include compatibilizers. Compatabilizers are classes of materials that are blended into bulk resin blends to assist in improving dispersion properties within the material matrix. Compatabilizers typically function by having affinity for the separate materials used in blends thus acting as an interfacial surface modifier for components of the polymeric the blends.

Haze is a property of polymeric materials that is critical to manage for many optical, printing and aesthetic applications. The refractive index deviation of different polymeric materials in blends are critical for managing the haze of blends. Furthermore, the dispersion size of the dispersed phase in a compatible blend is also essential for haze control. Small sized particle dispersion will have lower haze as classically described by Mie's scattering law. Particle dispersion smaller than the wave length of light will have the lowest haze due to the apparent relative transparency of the materials to the visible light spectrum. In one or more embodiments, the multilayer article has a bulk haze of less than or equal to 20%, as measured by ASTM D 1003. The term "bulk haze" refers to the percentage of incident incandescent light that is transmitted through a multilayer article that is deflected or scattered more than 2.5 degrees from the incoming light direction. On the other hand, the term "light transmission" refers to percentage of incident light that passes through a multilayer article. The bulk haze of a multilayer article may be measured with a spectrophotometer or haze meter using ASTM method D 1003. In one or more embodiments, the bulk haze of the multilayer article is less than or equal to 20%. In other embodiments, the bulk haze is less than or equal to 18%, less than or equal to 15%, less than or equal to 12%, less than or equal to 10%, less than or equal to 8%, less than or equal to 5%, less than or equal to 3%, or less than or equal to 2%.

In one or more embodiments, at 260° C., the heterogeneous blend has a first melt viscosity $\eta_1$ and the homogenous material has a second melt viscosity $\eta_2$, where $|\eta_1-\eta_2|/\eta_1$ is from greater than 0 to less than or equal to 1.50. The melt viscosities are measured prior to extrusion. In some embodiments, $|\eta_1-\eta_2|/\eta_1$ is from greater than 0 to 1.50. In embodiments, $|\eta_1-\eta_2|/\eta_1$ is from greater than 0 to 1.25, from greater than 0 to 1.00, from greater than 0 to 0.75, from greater than 0 to 0.50, from greater than 0 to 0.25, from 0.25 to 1.50, from 0.25 to 1.25, from 0.25 to 1.00, from 0.25 to 0.75, from 0.25 to 0.50, from 0.50 to 1.50, from 0.50 to 1.25, from 0.50 to 1.00, from 0.50 to 0.75, from 0.75 to 1.50, from 0.75 to 1.25, from 0.75 to 1.00, from 1.00 to 1.50, from 1.00 to 1.25, or from 1.25 to 1.50. Extensive interlayer variation of viscosities are well known to give layer flow instabilities in multilayer systems. Flow instabilities can result in poor thickness profile in the cross or machine direction in a typical process. In some embodiments, it may be necessary to manage viscosity profiles properly in order to maintain the film flatness within the multilayer process.

Without intent to be bound by any particular theory, it is believed that two polymers or two blends of polymers should have a relatively small differences in melt viscosity, such as with 5% relative viscosity at typical extrusion melt conditions and appropriate shear rates of approximately 10 to 100 $s^{-1}$. Layers having relative viscosities within this range, may allow for multilayer articles with low density and low haze. The relatively small difference in viscosities may restrict the layers of the multilayer articles from mixing when the polymer or polymer blends are in a molten state (such that the polymer temperature is greater the melt temperature of the polymer or polymer blend). The relatively small difference in viscosity allows the two polymers or polymer blends to be split and stacked to form a stack of A-B units. The splitting and stacking may occur multiple times to form 16, 32, 64, 128, 256, 512 or 1024 individual layers of A-B repeating layers. When a desired number of layers is reached, the melt may be pushed through an extrusion die and cast onto a water-cooled roller and wound on a rotating core or passed on for further processing, for example, as a film or pellet. Materials with differences in melt viscosities greater than 5% at similar melt temperatures may exhibit rheological stresses between the individual sub-micron layers. The stresses may deform and distress the voiding structures and cause agglomerates to form, thereby increasing the bulk haze.

In one or more embodiments, the multilayer article may have a particular density. For example, density reduction may be sought for many reasons. For instance, less material is utilized to make an equivalent thickness of material, thus potentially reducing cost. Additionally or alternatively, the use of less material may be a desired goal of light-weighting packaging structures for potential environmental benefit. For example, it is well known in the art to reduce the density of thermoplastic materials through cavitation or admixing with miscible materials of lower bulk density. In the case of the production of high clarity thermoplastic filmic materials with low density, conventional methods rely on resins that have an inherently low density. For instance, PET films are often replaced with biaxially oriented nylon (BON) films. Nylon resins, having a lower intrinsic density that PET resin, may produce materials with a higher yield, or higher surface area per mass unit at an equivalent thickness. However, other attributes like gas barrier and thermal resistance that PET filmic materials affords, may need to be sacrificed in order to utilize the lower density BON materials. In addition, the lower volume production of BON based resins results in higher costs negating potential value in the market from higher yield. Embodiments of the multilayer articles described herein may achieve lower densities without sacrificing other attributes like gas barrier and thermal resistance.

In embodiments of the multilayer article described herein, a skin layer on each side of the doublet stack is optional. In embodiments, the skin layers may have a combined thickness that is from 5% to 10% of the total thickness of the multilayer article. In further embodiments, the skin layers may have a combined thickness that is from 5% to 9%, from 5% to 8%, from 5% to 7%, from 5% to 6%, from 6% to 10%, from 6% to 9%, from 6% to 8%, from 6% to 7%, from 7% to 10%, from 7% to 9%, from 7% to 8%, from 8% to 10%, from 8% to 9%, or from 9% to 10% of the total thickness of the multilayer article. In embodiments, each skin layer may comprise the same material composition as one of nanolayer A and nanoayer B. In embodiments, each skin layer may not comprise the same material composition as either nanolayer A or nanolayer B. In some embodiments, the material composition of each skin layer may be the same as the other skin layer. In some embodiments, the skin layers may have different material compositions. Without being bound by theory, the skin layer may prevent migration of contaminates found in any of the recycle streams during the manufacturing process. In embodiments, the material or materials chosen for the skin layers may depend on viscosity.

Methods

In addition to the type of material used in the production of the multilayer articles described herein, processing technology is heavily relied on the produce multilayer articles with various desired properties. In embodiments, the properties of the multilayer article may be achieved via modified casting and stretching processes, which may include sequential biaxially orientation lines, blown film lines, cast and sheet extrusion lines and alike.

Blending process for polymers and resin can involve many different process. For instance, pellet like materials may be dry blended in a hopper and melted and mixed through use of an extruder and repelletized to achieve a reasonable degree of mixing. Twin screw extruders may be utilized to blend resinous materials due to the high shear during mixing. High mixing shear frequently produces smaller and more uniform dispersion characteristics of resinous materials resulting in enhanced properties of blends. Poorly dispersed material may possess poor phase boundary properties that result in mechanical, optical and other issues within blends.

In embodiments, neat resin, a masterbatch, a mix of dry blended resins or resins produced from recycled bales of PCR and PIR waste are coextruded through a feed block so that a flow with two distinct layers is produced. The differential ratio of the extrusion flow rates controls the resulting layer thickness ratio and the ratio of the materials in the final pellet material.

Nano-layering is the process wherein the flow is directed through a series of "square mixing" blocks that split the flow laterally and then vertically stack them to double the number of layers while maintaining the same cross-sectional area and flow rate. This technique may result in lower thermal stress on the resinous materials during the dispersing process.

As the molten polymer is pushed through successive square mixers, the flow goes from being two layers to 4, then to 8, 16, 32, 64, 128, 256, 512, and so on in successive powers of 2. Likewise, a manifold system that deposits alternating layers inside a feed block before reaching the exit of the extruder can also be used.

An example of one method of forming a multilayer article may be referred to as square mixing processing, which includes combining two separate melt streams to form a double-layered system. The double layered system is passed through feed blocks that divide the double-layered system perpendicular to a stacking plane. The divided double-layered system is guided vertically apart and passed through a die flattening them and stacking them on top of each other. This effectively doubles the number of alternating layers. Multiple feed blocks may be added in series to double the amount of layers each time each layer was pass through one. Examples of this square mixing processing technique can be found in U.S. Pat. Nos. 3,557,265; 3,565,985; 3,759,647; 5,380,479; 3,328,003; 3,565,985; 3,479,425; 3,555,128; 3,773,882; 4,125,581; 5,094,793; 5,380,479; and US Patent Application Publications 2010/0239700; 2010/0227136; 2012/0288696; 2013/0011506.

The extrusion methods for forming embodiments of the multilayer articles described herein may involve many different process. For instance, various dies may be utilized to produce multilayer films and multilayer pellets, comprised of multiple layers or strands, respectively. In further embodiments, other multilayer articles are contemplated.

Methods of producing the multilayer articles described herein may include a biaxial orientation process, which comprises passing a cast film through a set of heated rollers followed by heating in an oven. In embodiments, the cast film first passes through a set of heated rollers sequentially increasing in speed thus stretching the film resulting in strain induced crystallization. Further strain induced crystallization occurs as the monoaxially stretched film may be guided into an oven, for example, by mechanical grips along the edges of the film. In the oven, the grips may be guided apart, which may result in further stretching of the film perpendicular to the direction of the previous stretching stage (via the rollers). The resulting film may have a high degree of orientation in the two major axes resulting in higher mechanical properties and barrier.

Without being bound by theory, in the case of thermoplastic materials like PP or PE, low density and poorly crystalline (lower than 20% crystallinity) materials can be made at low (less than 200° C.) extrusion casting and stretching conditions. Such materials are readily heat-sealed to other materials. In general, having lower than 20% crystallinity may result in poor quality extruded products. Stretching at higher stretch ratios and annealing materials produces films and sheets with the ability to crystallize up to 40-50% more as measured via DSC techniques. However, high stretching ratios (for example, 5 to 7 times in each direction) may significantly increase the crystallinity of the materials resulting in increased thermal resistance, barrier properties and solvent resistance of these same materials. In embodiments, the processing temperatures, stretching ratios, heat setting conditions, processing speeds and other machine related processes may be optimized to achieve desired end-use properties.

Measurement Methods

Measurements of haze can be done as is well known in the art such as with ASTM D1003 or equivalent techniques. Density can be measured by any of well-known methods such as ASTM D792 or through the use of helium or nitrogen pycnometery.

Glass Transition Temperature (Tg)

Glass transition temperature as can be measured by differential scanning calorimetry (DSC), thermomechanical analysis (TMA) or rheological methods. In the case of miscible, or homogeneous blends, a single phase structure will be present in the bulk blended materials. This is typically seen as a single glass transition temperature as can be measured by differential scanning calorimetry (DSC), thermomechanical analysis (TMA) or rheological methods. Alternatively, in DSC measurements, immiscible blends will frequently present two $T_g$ owing to the largely separate phase structures of the materials. Compatible blends will often have a uniform dispersed phase structure, and can have complex thermal and rheological profiles.

Phase Structure

Microscopy is often used to study the phase structures of polymer blends. Small dispersion grain sizes are often preferred when mixing immiscible resins to improve the overall blend properties. For nanoscale features, Scanning Electron Microscopy (SEM) or Scanning Tunneling Electron Microscopy (TEM or STEM) are typically the tools used. Frequently, samples may be embedded in liquid epoxy and sharply cut into a cross section so the samples may be evaluated.

EXAMPLES

It should be understood that Samples 1-25 are provided to illustrate embodiments described in this disclosure and are not intended to limit the scope of this disclosure or its appended claims.

Example 1: Production of Samples 1-25

Example 1 describes how Samples 1-25 were prepared. In Example 1, Samples 1-9 were prepared using a method where the final multilayer article included 512 alternating layers; Samples 10-11 were prepared using a method where the final multilayer article included 256 alternating layers; Sample 12 was prepared using a method where the final multilayer article included 128 alternating layers; Samples 13-21 were prepared using a method where the final multilayer article included 64 alternating layers; Samples 22-24 were prepared using a method where the final multilayer article included 1024 alternating layers; and Sample 25 was prepared using a method where the final multilayer article included 4096 alternating layers.

Table 1 summarizes the extrusion conditions for Samples 1-25, and the following paragraphs describe how Samples 1-25 were produced, in greater detail. To produce the pellet samples (Samples 13-25), a small plate with holes was placed over the die outlet to produce strands, which formed the multilayer pellet having a thickness of 3.3 mm.

TABLE 1

Extrusion conditions for Samples 1-25.

| | Unit | Samples 1-12 | Samples 13-25 |
|---|---|---|---|
| Thickness | (μm) | 200 | 200 |
| Die gap | (mm) | 0.3 | 3.5 |
| Layer percentage Extr. A | (%) | 30% | 30% |
| Layer percentage Extr. B | (%) | 70% | 70% |
| Melt Pressure Extr. A | (bar) | 50 | 50 |
| Melt Pressure Extr. B | (bar) | 50 | 50 |
| Melt Temperature Extr. A | (° C.) | 280 | 280 |
| Melt Temperature Extr. B | (° C.) | 280 | 280 |
| Output Rate | (kg/h) | 5 | 5 |
| Screw Speed Extr. A | (rpm) | 20 | 20 |
| Screw Speed Extr. B | (rpm) | 20 | 20 |
| Take-off Speed | (m/min) | 4 | 4 |

Sample 1

Sample 1 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 50 wt. % virgin PET blend chip (commercially available from Far Eastern New Century (FENC) as Polyprotect APB; intrinsic viscosity of 0.73) admixed with 50 wt. % virgin polypropylene (commercially available from Pinnacle Polymers as 1112), based on the total weight of Layer A. The homogenous Layer B was 100 wt. % recycled PET (commercially available from Polyquest Incorporated as PCQ69; intrinsic viscosity of 0.71), based on the total weight of Layer B. Per methodologies common in the art, the inherent viscosities were measured following ASTM D403-18 and then translated into intrinsic viscosity via the Bilmeyer equation:

$$\eta_{inr} = 0,25 * \frac{(v_{rel} - 1) + (3 * \log e v_{rel})}{C}$$

$$v_{rel} = \frac{v_{Solution}}{v_{Solvent}}$$

To produce Sample 1, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 2

Sample 2 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 50 wt. % virgin PET blend (commercially available from FENC as Poliprotect AP; intrinsic viscosity of 0.73 admixed with 50 wt. % virgin polypropylene (commercially available from Pinnacle incorporated as Pinnacle 1635), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 2, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 3

Sample 3 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 60 wt. % virgin PET blend (commercially available from FENC as Polyprotect APB intrinsic viscosity of 0.73) admixed with 40 wt. % virgin polyethylene (commonly commercially available polyethylenes such as DOWLEX 2036G from DOW, based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 3, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 4

Sample 4 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 50 wt. % virgin PET blend (commercially available from FENC as Poliprotect APB; intrinsic viscosity of 0.71) admixed with 40 wt. % virgin polypropylene (commercially available from Pinnacle Polymers as 1112) and 10 wt. % virgin maleic anhydride grafted polypropylene (commercially available from Addivant as Polybond 3150). The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 4, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 5

Sample 5 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 80 wt. % virgin PET blend (commercially available from FENC as Poliprotect APB; intrinsic viscosity of 0.71) admixed with 5 wt. % virgin polypropylene (commercially available from Pinnacle Polymers as 1112, 5 wt. % virgin polyethylene (commonly commercially available polyethylenes such as DOWLEX 2036G from DOW), 5 wt. % virgin polystyrene (commercially available from Trinseo as Styron 6500), and 5 wt. % polycarbonate (PC) (commercially available from Trinseo as Calibre 200-6). The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18, To produce Sample 5, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 6

Sample 6 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 80 wt. % virgin PET blend (commercially available from FENC as Poliprotect APB; intrinsic viscosity of 0.71) admixed with 20 wt. % virgin polypropylene (commercially available from Pinnacle Polymers as 1112), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 6, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 7

Sample 7 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 90 wt. % virgin PET blend (commercially available from FENC as Poliprotect APB; intrinsic viscosity of 0.71) admixed with 10 wt. % virgin polypropylene (commercially available from Pinnacle Polymers as 1112), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 7, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 8

Sample 8 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 90 wt. % virgin PET blend (commercially available from FENC as polyprotect APB; intrinsic viscosity of 0.71) admixed with 8 wt. % virgin polypropylene (commercially available from Pinnacle Polymers as 1112) and 2 wt. % virgin maleic anhydride grafted polypropylene (commercially available from Addivant as Polybond 3150). The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 8, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 9

Sample 9 was a multilayer film was produced by extruding a stack of 512 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 95 wt. % virgin PET blend (commercially available from FENC as Polyprotect APB; intrinsic viscosity of 0.71) admixed with 5 wt. % recycled silicone coated PET. The recycled silicone coated PET was captured from a post industrial process for labelling from a liner material that was coated continuously with silicone at about 2 wt. % based on the total weight of the liner. The silicone coated liner was recovered and recycled into pellets using a conventional single screw extruder. The IV of the pellet was about 0.55. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 9, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 10

Sample 10 was a multilayer film was produced by extruding a stack of 256 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 95 wt. % virgin PET blend (commercially available from FENC as Poliprotect APB intrinsic viscosity of 0.71) admixed with 5 wt. % recycled silicone coated PET. The recycled silicone coated PET was captured from a post industrial process for labelling from a liner material that was coated continuously with silicone at about 2 wt. % based on the total weight of the liner. The silicone coated liner was recovered and recycled into pellets using a conventional single screw extruder. The IV of the pellet was about 0.55. The recycled silicone coated PET was prepared by recycling spent label liner into pellet, based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18

To produce Sample 10, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 11

Sample 11 was a multilayer film was produced by extruding a stack of 256 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 80 wt. % virgin PET blend (commercially available from FENC as Polyprotect APB intrinsic viscosity of 0.71) admixed with 20 wt. % virgin polyethylene (commonly commercially available polyethylenes such as DOWLEX 2036G from DOW), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 11, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 12

Sample 12 was a multilayer film was produced by extruding a stack of 128 alternating layers containing A-B units of resinous material. Layer A comprised a heterogeneous blend and made up 30% of the total thickness of the multilayer film. Layer B comprised a homogenous layer and made up 70% of the total thickness of the multilayer film. The heterogeneous Layer A was a blend of 30 wt. % virgin PET blend (commercially available from FENC as Polyprotect APB; intrinsic viscosity of 0.71) admixed with 30 wt. % virgin polyethylene (commonly commercially available polyethylenes such as DOWLEX 2036G from DOW), and 30 wt. % virgin polypropylene (commercially available from Pinnacle Polymers as 1112) based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18, To produce Sample 12, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr.

Sample 13

Sample 13 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 90 wt. % vacuum dried virgin PET blend (commercially available from FENC as Polyprotect APB; intrinsic viscosity of 0.71) admixed with 10 wt. % vacuum dried virgin cyclic olefin copolymer (commercially available from Topas Incorporated as 8007), based on the total weight of Layer A. The homogenous Layer B was 100 wt. % vacuum dried recycled PET (commercially available from Polyquest Incorporated as PCQ69; intrinsic viscosity of 0.71), based on the total weight of Layer B. The inherent viscosities were measured following ASTM D403-18.

To produce Sample 13, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 14

Sample 14 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 90 wt. % PET blend (commercially available from FENC as Polyprotect APB; intrinsic viscosity of 0.71) admixed with 10 wt. % virgin polypropylene (commercially available from Pinnacle Incorporated as Pinnacle 1635), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 14, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 15

Sample 15 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 90 wt. % virgin PET blend (commercially available from FENC as Poliprotect APB; intrinsic viscosity of 0.71) admixed with 10 wt. % virgin polypropylene graft maleic anhydride copolymer (commercially available from Addivant Incorporated as Polybond 3150), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 15, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 16

Sample 16 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 90 wt. % virgin PET blend (commercially available from FENC as poliprotect APB; intrinsic viscosity of 0.71) admixed with 10 wt. % of a 50:50 blend of virgin polypropylene (commercially available from Pinnacle Incorporated as 1635) and virgin polypropylene graft maleic anhydride copolymer (commercially available from Addivant Incorporated as Polybond 3150), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 16, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips Sample 17

Sample 17 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 95 wt. % virgin PET blend (commercially available from FENC as Poliprotect APB; intrinsic viscosity of 0.71) admixed with 5 wt. % polystyrene (commercially available from Trinseo Styron 6500, based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 17, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 18

Sample 18 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 95 wt. % virgin PET blend (commercially available from FENC as Poliprotect APB; intrinsic viscosity of 0.71) admixed with 5 wt. % polyethylene (commonly commercially available polyethylenes such as DOWLEX 2036G from DOW), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 18, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 19

Sample 19 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 95 wt. % virgin PET blend (commercially available from FENC as Poliprotect APB; intrinsic viscosity of 0.71) admixed with 5 wt. % PC (commercially available from Trinseo as Calibre 200-6, based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 19, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 20

Sample 20 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 80 wt. % virgin PET blend (commercially available from FENC as Poliprotect APB; intrinsic viscosity of 0.71) admixed with 20 wt. % virgin polypropylene (commercially available from Pinnacle Incorporated as 1635), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 20, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips Sample 21

Sample 21 was a multilayer pellet was produced by extruding a stack of 64 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 70 wt. % virgin PET blend (commercially available from FENC as poliprotect APB; intrinsic viscosity of 0.71) admixed with 30 wt. % virgin polypropylene (commercially available from Pinnacle Incorporated as 1635, based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 21, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 22

Sample 22 was a multilayer pellet was produced by extruding a stack of 1024 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 90 wt. % virgin PET blend (commercially available from FENC as Poliprotect APB; intrinsic viscosity of 0.71) admixed with 10 wt. % a virgin cyclic olefin copolymer (COC) from (commercially available from Topas Incorporated as 8007), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 22, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 23

Sample 23 was a multilayer pellet was produced by extruding a stack of 1024 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 95 wt. % virgin PET blend (commercially available from FENC as poliprotect APB; intrinsic viscosity of 0.71) admixed with 5 wt. % recycled silicone coated PET. The recycled silicone coated PET was captured from a post industrial process for labelling from a liner material that was coated continuously with silicone at about 2 wt. % based on the total weight of the liner. The silicone coated liner was recovered and recycled into pellets using a conventional single screw extruder. The IV of the pellet was about 0.55. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 23, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280°

C. at the rate of 10 lbs/hr. Strands of molten multilayer materials were quenched in a water bath at approximately 40° F. and subsequently cut to pellet sized chips.

Sample 24

Sample 24 was a multilayer pellet was produced by extruding a stack of 1024 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 95 wt. % virgin PET blend (commercially available from FENC as poliprotect APB; intrinsic viscosity of 0.71) admixed with 5 wt. % recycled silicone coated PET. The recycled silicone coated PET was captured from a post industrial process for labelling from a liner material that was coated continuously with silicone at about 2 wt. % based on the total weight of the liner. The silicone coated liner was recovered and recycled into pellets using a conventional single screw extruder. The IV of the pellet was about 0.55. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 24, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. Strands of molten multilayer materials were quenched in a water bath at approximately 40° F. and subsequently cut to pellet sized chips.

Sample 25

Sample 25 was a multilayer pellet was produced by extruding a stack of 4096 alternating layers containing A-B units of resinous material. Layer A comprised a heterogeneous blend and made up 30% of the total thickness of the multilayer pellet. Layer B comprised a homogenous layer and made up 70% of the total thickness of the multilayer pellet. The heterogeneous Layer A was a blend of 90 wt. % virgin PET blend (commercially available from FENC as poliprotect APB; intrinsic viscosity of 0.71) admixed with 10 wt. % a virgin cyclic olefin copolymer (COC) from (commercially available from Topas Incorporated as 8007), based on the total weight of Layer A. The homogenous Layer B was 100 wt. % recycled PET (commercially available from Polyquest Incorporated as PCQ69; intrinsic viscosity of 0.71), based on the total weight of Layer B. The inherent viscosities were measured following ASTM D403-18.

To produce Sample 25, the blend of homogenous Layer A was dried at 100° C. for 4 hours in a vacuum oven and added to a first extruder, and the PET of homogenous Layer B was dried at 100° C. for 4 hours in a vacuum oven and added to a separate extruder where each layer was processed at 280° C. at the rate of 10 lbs/hr. The two materials were extruded at a 50% weight ratio through a series of 7 square mixing elements. The 64 layer fluid flow was extruded through a stand head into filaments. The resulting resin filaments were quenched in a water batch and cut.

TABLE 2

Summary of Samples 1-25.

| Example | No. of Layers | Material of Layer B | Article Type | Material of Layer A |
|---|---|---|---|---|
| Sample 1 | 512 | PET | Film | 50/50 PET/PP2 |
| Sample 2 | 512 | PET | Film | 50/50 PET/PP3 |
| Sample 3 | 512 | PET | Film | 60/40 PET/PE |
| Sample 4 | 512 | PET | Film | 50/40/10 PET/PP2/PPgMA |
| Sample 5 | 512 | PET | Film | 80/5/5/5/5 PET/PP/PE/PS/PC |
| Sample 6 | 512 | PET | Film | 80/20 PP |
| Sample 7 | 512 | PET | Film | 90/10 PET/PP2 |
| Sample 8 | 512 | PET | Film | 90/8/2 PET/PP/PPgMA |
| Sample 9 | 512 | PET | Film | Liner 5/95 Silicone/PET |
| Sample 10 | 254 | PP | Film | Liner 5/95 Silicone/PP |
| Sample 11 | 254 | PP | Film | Label 80/20 PP/PE |
| Sample 12 | 127 | PET | Film | Lam 30/30/30 PP/PET/PE |
| Sample 13 | 64 | PET | Pellet | 10/90 COC/PET |
| Sample 14 | 64 | PET | Pellet | 10/90 PP/PET |
| Sample 15 | 64 | PET | Pellet | 10/90 PPMA/PET |
| Sample 16 | 64 | PET | Pellet | 10/90 (50/50 PPMA/PP)/PET |
| Sample 17 | 64 | PET | Pellet | 95/5 PET/PS |
| Sample 18 | 64 | PET | Pellet | 95/5 PET/PE |
| Sample 19 | 64 | PET | Pellet | 95/5 PET/PC |
| Sample 20 | 64 | PET | Pellet | 20/80 PP/PET |
| Sample 21 | 64 | PET | Pellet | 30/70 PP/PET |
| Sample 22 | 1024 | PET | Pellet | 10/90 COC/PET |
| Sample 23 | 1024 | PET | Pellet | 10/90 PP/PET |
| Sample 24 | 1024 | PET | Pellet | 10/90 PPMA/PET |
| Sample 25 | 4096 | PET | Pellet | 10/90 PET/COC |

Example 2: Production of Comparative Samples A-Q

Table 3 summarizes the extrusion conditions for Comparative Samples A-Q, and the following paragraphs describe how Samples 1-25 were produced, in greater detail. To produce the pellet samples (Comparative Samples I-Q), a small plate with holes was placed over the die outlet to produce strands, which formed the multilayer pellet having a thickness of 3.3 mm.

TABLE 3

Extrusion conditions for Film 1 and Comparative Films A-Q.

| | Unit | Comparative Samples A-H | Comparative Samples I-Q |
|---|---|---|---|
| Thickness | (μm) | 200 | 200 |
| Die gap | (mm) | 0.3 | 3.5 |
| Layer percentage Extr. A | (%) | 30% | 30% |
| Layer percentage Extr. B | (%) | 70% | 70% |
| Melt Pressure Extr. A | (bar) | 50 | 50 |
| Melt Pressure Extr. B | (bar) | 50 | 50 |
| Melt Temperature Extr. A | (° C.) | 280 | 280 |
| Melt Temperature Extr. B | (° C.) | 280 | 280 |
| Output Rate | (kg/h) | 5 | 5 |
| Screw Speed Extr. A | (rpm) | 20 | 20 |
| Screw Speed Extr. B | (rpm) | 20 | 20 |
| Take-off Speed | (m/min) | 4 | 4 |

Comparative Sample A

Comparative Sample A was a monolayer film produced by extruding a blend of 50 wt. % virgin PET blend (commercially available from FENC as Polyprotect APB intrinsic viscosity of 0.73) admixed with 50 wt. % virgin polypropylene (commercially available from Pinnacle Polymers as 1112). The material was extruded at 280° C. at the rate of 10 lbs/hr.

Comparative Sample B

Comparative Sample B was a monolayer film produced by extruding a blend of 75 wt. % virgin PET blend (commercially available from FENC as Polyprotect APB intrinsic viscosity of 0.73) admixed with 25 wt. % virgin polypropylene (commercially available from Pinnacle Polymers as 1112). The material was extruded at 280° C. at the rate of 10 lbs/hr.

Comparative Sample C

Comparative Sample C was a monolayer film produced by extruding a blend of 80 wt. % virgin PET blend (commercially available from FENC as Polyprotect APB intrinsic viscosity of 0.73) admixed with 5 wt. % virgin polypropylene (commercially available as Pinnacle 1112); 5 wt. % virgin polyethylene (commercially available as DOWLEX 2036G); 5 wt. % virgin polystyrene (commercially available from Trinseo as Styron 6500); 5 wt. % virgin PC (commercially available from from Trinseo as Calibre 200-6). The material was extruded at 280° C. at the rate of 10 lbs/hr.

Comparative Sample D

Comparative Sample D was a monolayer film produced by extruding a blend of 90 wt. % virgin PET blend (commercially available from FENC as Polyprotect APB intrinsic viscosity of 0.73) admixed with 10 wt. % virgin polypropylene (commercially available from Pinnacle Polymers as 1112). The material was extruded at 280° C. at the rate of 10 lbs/hr.

Comparative Sample E

Comparative Sample E was a monolayer film produced by extruding a blend of 95 wt. % virgin PET blend (commercially available from FENC as Polyprotect APB intrinsic viscosity of 0.73) admixed with 5 wt. % recycled silicone coated PET. The recycled silicone coated PET was captured from a post industrial process for labelling from a liner material that was coated continuously with silicone at about 2 wt. % based on the total weight of the liner. The silicone coated liner was recovered and recycled into pellets using a conventional single screw extruder. The IV of the pellet was about 0.55. The material was extruded at 280° C. at the rate of 10 lbs/hr.

Comparative Sample F

Comparative Sample F was a monolayer film produced by extruding a blend of 95 wt. % virgin polypropylene (commercially available as Pinnacle 1112) admixed with 5 wt. % recycled silicone coated PP film. The material was extruded at 280° C. at the rate of 10 lbs/hr.

Comparative Sample G

Comparative Sample G was a monolayer film produced by extruding a blend of 40 wt. % virgin PET blend (commercially available from FENC as Polyprotect APB intrinsic viscosity of 0.73) admixed with 30 wt. % virgin polypropylene (commercially available as Pinnacle 1112) and with 30 wt. % virgin polyethylene (commercially available as DOWLEX 2036G). The material was extruded at 280° C. at the rate of 10 lbs/hr.

Comparative Sample H

Comparative Sample H was a monolayer film produced by extruding a blend of 80 wt. % virgin PET blend (commercially available from FENC as Polyprotect APB intrinsic viscosity of 0.73) admixed with 20 wt. % virgin polyethylene (commercially available as DOWLEX 2036G). The material was extruded at 280° C. at the rate of 10 lbs/hr.

Comparative Sample I

Comparative Sample I was a monolayer pellet strand produced by extruding a blend of 80 wt. % virgin PET blend (commercially available from FENC as Polyprotect APB intrinsic viscosity of 0.73) with 20 wt. % virgin polypropylene (commercially available as Pinnacle 1112). The material was extruded at 280° C. at the rate of 10 lbs/hr and quenched in a water bath at 40° F. before palletization.

Comparative Sample J

Comparative Sample J was a monolayer pellet strand produced by extruding a blend of 80 wt. % virgin PET blend (commercially available from FENC as Polyprotect APB intrinsic viscosity of 0.73) with 5 wt. % virgin polypropylene (commercially available as Pinnacle 1112); 5 wt. % virgin polyethylene (commercially available from DOWLEX 2036G); 5 wt. % virgin polystyrene (commercially available from Trinseo as Styron 6500); and 5 wt. % virgin PC (commercially available from Trinseo as Calibre 200-6). The material was extruded at 280° C. at the rate of 10 lbs/hr and quenched in a water bath at 40° F. before palletization.

Comparative Sample K

Comparative Sample K was a monolayer strand produced by extruding a blend of 90 wt. % virgin PET blend (commercially available from FENC as Polyprotect APB intrinsic viscosity of 0.73) with 10 wt. % virin polypropylene (commercially available as Pinnacle 1112). The material was extruded at 280° C. at the rate of 10 lbs/hr and quenched in a water bath at 40° F. before palletization.

Comparative Sample L

Comparative Sample L was a monolayer pellet strand produced by extruding blend of 95 wt. % vacuum dried virgin PET blend (commercially available from FENC as Polyprotect APB intrinsic viscosity of 0.73) admixed with 5 wt. % vacuum dried virgin COC (commercially available as TOPAS 8007). The material was extruded at 280° C. at the rate of 10 lbs/hr and quenched in a water bath at 40° F. before palletization.

Comparative Sample M

Comparative Sample L was a monolayer pellet strand produced by extruding blend of 95 wt. % vacuum dried virgin PET blend (commercially available from FENC as Polyprotect APB intrinsic viscosity of 0.73) admixed with 5 wt. % vacuum dried virgin polystyrene (commercially available Trinseo as Styron 6500). The material was extruded at 280° C. at the rate of 10 lbs/hr and quenched in a water bath at 40° F. before palletization.

Comparative Sample N

Comparative Sample N was a monolayer pellet strand produced by extruding a blend of 95 wt. % vacuum dried virgin PET blend (commercially available from FENC as Polyprotect APB intrinsic viscosity of 0.73) admixed with 5 wt. % virgin polyethylene (commercially available as DOWLEX 2036G). The material was extruded at 280° C. at the rate of 10 lbs/hr and quenched in a water bath at 40° F. before palletization.

Comparative Sample O

Comparative Sample O was a monolayer pellet strand produced by extruding a blend of 95 wt. % vacuum dried virgin PET blend (commercially available from FENC as Polyprotect APB intrinsic viscosity of 0.73) admixed with 5 wt. % vacuum dried virgin PC (commercially available from Trinseo as Calibre 200-6). The material was extruded at 280° C. at the rate of 10 lbs/hr and quenched in a water bath at 40° F. before palletization.

Comparative Sample P

Comparative Sample P was a monolayer pellet strand produced by extruding a blend of 75 wt. % vacuum dried virgin PET blend (commercially available from FENC as Polyprotect APB intrinsic viscosity of 0.73) admixed with 25 wt. % vacuum dried virgin polypropylene (commercially available as Pinnacle 1112). The material was extruded at 280° C. at the rate of 10 lbs/hr and quenched in a water bath at 40° F. before palletization.

Comparative Sample Q

Comparative Sample Q was a monolayer pellet strand produced by extruding a blend of 70 wt. % vacuum dried virgin PET blend (commercially available from FENC as Polyprotect APB intrinsic viscosity of 0.73) admixed with 30 wt. % vacuum dried virgin polypropylene (commercially available as Pinnacle 1112). The material was extruded at 280° C. at the rate of 10 lbs/hr and quenched in a water bath at 40° F. before palletization.

TABLE 4

Summary of Comparative Samples A-Q.

| Example | No. of Layers | Material of Layer A | Material of Layer B | Article Type |
|---|---|---|---|---|
| Comparative Sample A | 1 | N/A | 50/50 PET/PP | Film |
| Comparative Sample B | 1 | N/A | 25/75 PET/PP | Film |
| Comparative Sample C | 1 | N/A | 5/5/5/5/80 PC/PP/PE/PE/PET | Film |
| Comparative Sample D | 1 | N/A | 10/90 PP/PET | Film |
| Comparative Sample E | 1 | N/A | Liner 5/95 Silicone/PET | Film |
| Comparative Sample F | 1 | N/A | Liner 5/95 Silicone/PP | Film |
| Comparative Sample G | 1 | N/A | LAM 30/40/30 PP/PET/PE | Film |
| Comparative Sample H | 1 | N/A | Label 80/20 PP/PE | Film |
| Comparative Sample I | 1 | N/A | 20/80 PP/PET | Pellet |
| Comparative Sample J | 1 | N/A | 5/5/5/5/80 PC/PP/PE/PE/PET | Pellet |
| Comparative Sample K | 1 | N/A | 10/90 PP/PET | Pellet |
| Comparative Sample L | 1 | N/A | 95/5 PET/COC | Pellet |
| Comparative Sample M | 1 | N/A | 95/5 PET/PS | Pellet |
| Comparative Sample N | 1 | N/A | 95/5 PET/PE | Pellet |
| Comparative Sample O | 1 | N/A | 95/5 PET/PC | Pellet |
| Comparative Sample P | 1 | N/A | 20/80 PP/PET | Pellet |
| Comparative Sample Q | 1 | N/A | 30/70 PP/PET | Pellet |

Example 3: Analysis of Samples 1-25 and Comparative Samples A-Q

In Example 3, Samples 1-25 and Comparative Samples A-Q produced according to Examples 1 and 2 previously describe were graded on extrusion quality, the ability to be oriented, tensile strength and clarity.

The extrusion quality is the observed ability to form a uniform article at the cast roll. A "good" extrusion rating indicates minor or no abnormalities were noted during processing. A "moderate" extrusion quality rating means special attention was needed to extrude the multilayer blend, such as, finely tuning the extrusion rate ratios. Furthermore, a "poor" extrusion rating was given to a blend and structure that was unable to form a uniform article (i.e. film or pellet) at the exit of the slit die due to "swiss cheesing" (a unextrudable, chunky consistency), material running to the edges of the extruder, or other flow inconsistencies.

The ability to be oriented was defined as "good" when there were little to no film breaks in the orienting process and the resulting film was ductile. "Moderate" orientatability means the film could regularly be stretched, but may encountered some film breaks or were fragile after stretching. A "poor" orientatability rating was given to films that were largely unable to be stretched without complete breakage.

Tensile strength measurements were performed on the multilayer articles in accordance with ASTM D882. "Good" tensile strength ratings were given when greater than 85% of the primary homogenous component tensile strength was obtained. "Moderate" tensile strength ratings were given when between 65-85% of the homogenous component tensile strength was obtained. A "poor" rating for tensile strength was assigned when less than 650% of the homogenous component tensile strength was obtained.

Clarity measurements were also performed on the multilayer articles following ASTM D1746-15. "Good" clarity was defined as a clarity of 75% or greater, "moderate" clarity was defined as a clarity of between 50-75%, and "poor" clarity was defined as a clarity below 50%.

Pellet Samples 13-25 and Comparative Pellet Samples I-Q were only evaluated based on their ability to form strands outside of the extruder die strand head. The ability to be stranded received a "good" rating if there were minor or no breaks; a "moderate" rating was given if there were regular breaks of the strand, but lengthy strands could be formed; and a "poor" rating meant that little to no continuous strands could be formed.

TABLE 5

Analysis of Samples 1-25 and Comparative Samples A-Q.

| Example | Extrusion Quality | Ability to be Oriented | Tensile Strength | Clarity | Ability to be Stranded |
|---|---|---|---|---|---|
| Sample 1 | Good | Good | 65-85% | Moderate | |
| Sample 2 | Good | Good | 65-85% | Moderate | |
| Sample 3 | Good | Good | 65-85% | Moderate | |
| Sample 4 | Good | Good | 65-85% | Good | |
| Sample 5 | Good | Good | >85% | Good | |
| Sample 6 | Good | Good | >85% | Good | |
| Sample 7 | Good | Good | >85% | Good | |
| Sample 8 | Good | Good | >85% | Good | |
| Sample 9 | Good | Good | >85% | Good | |
| Sample 10 | Good | Good | >85% | Good | |
| Sample 11 | Good | Good | >85% | Good | |
| Sample 12 | Good | Good | 65-85% | Moderate | |
| Sample 13 | | | | | Good |
| Sample 14 | | | | | Good |
| Sample 15 | | | | | Good |
| Sample 16 | | | | | Good |
| Sample 17 | | | | | Good |
| Sample 18 | | | | | Moderate |
| Sample 19 | | | | | Good |
| Sample 20 | | | | | Good |
| Sample 21 | | | | | Moderate |
| Sample 22 | | | | | Good |
| Sample 23 | | | | | Good |
| Sample 24 | | | | | Good |
| Sample 25 | | | | | Good |
| Comparative Sample A | Poor | Poor | <65% | Poor | |
| Comparative Sample B | Moderate | Moderate | <65% | Poor | |
| Comparative Sample C | Moderate | Moderate | 65-85% | Moderate | |
| Comparative Sample D | Good | Good | 65-85% | Poor | |
| Comparative Sample E | Moderate | Moderate | 65-85% | Poor | |
| Comparative Sample F | Moderate | Moderate | 65-85% | Poor | |
| Comparative Sample G | Poor | Poor | <65% | Poor | |
| Comparative Sample H | Moderate | Moderate | 65-85% | Poor | |
| Comparative Sample I | | | | | Moderate |
| Comparative Sample J | | | | | Moderate |
| Comparative Sample K | | | | | Moderate |
| Comparative Sample L | | | | | Moderate |
| Comparative Sample M | | | | | Good |
| Comparative Sample N | | | | | Good |
| Comparative Sample O | | | | | Good |
| Comparative Sample P | | | | | Poor |
| Comparative Sample Q | | | | | Poor |

The invention claimed is:

1. A multilayer article comprising:

a stack $(A-B)_n$ of n layer units A-B, where n is greater than or equal to 64, each layer unit A-B comprising a first nanolayer A and a second nanolayer B overlying the first nanolayer A, and where the stack $(A-B)_n$ has an ABAB repeating pattern; and wherein:

the first nanolayer A of the layer units comprises a heterogeneous blend;

the second nanolayer B of the layer units comprising a homogeneous material;

wherein, at 260° C., the heterogeneous blend has a first melt viscosity η.sub.1 and the homogenous material has a second melt viscosity η.sub.2, where |η.sub.1-n.sub.2|/η.sub.1 is from greater than 0 to 1.25;

a ratio of a thickness of the first nanolayer A to a thickness of the second nanolayer B is from 90:10 to 10:90;

an overall thickness of the stack $(A-B)_n$ is greater than 1000 nanometers; and the multilayer article has a bulk haze of less than 20, as measured by ASTM D1003.

2. The multilayer article of claim 1, wherein the heterogeneous blend further comprises a second polymer immiscible with a first polymer.

3. The multilayer article of claim 1, wherein the heterogeneous blend comprises from 50 weight percent (wt. %) to 95 wt. % of a first polymer, based on the total weight of the heterogeneous blend and from 5 wt. % to 50 wt. % of a second polymer, based on the total weight of the heterogeneous blend.

4. The multilayer article of claim 1, wherein the multilayer article further comprises at least 250 layer units.

5. The multilayer article of claim 1, wherein the multilayer article further comprises at least 500 layer units.

6. The multilayer article of claim 1, wherein the multilayer article further comprises at least 1000 layer units.

7. The multilayer article of claim 1, wherein the heterogeneous blend comprises polyethylene terephthalate (PET).

8. The multilayer article of claim 1, wherein the homogenous material is PET.

9. The multilayer article of claim 1, wherein the heterogeneous blend comprises one or more of a cyclo-olefinic copolymer (COC), a polyethylene, a polypropylene, or a polystyrene.

10. The multilayer article of claim 1, wherein:

the heterogeneous blend comprises from 50% to 95% by weight PET, based on the total weight of the heterogeneous blend; and the homogenous material is PET.

11. The multilayer article of claim 10, wherein the PET of the heterogeneous blend and the PET of the homogenous material are different.

12. The multilayer article of claim 1, wherein the multilayer article is a multilayer pellet.

13. The multilayer article of claim 1, wherein the multilayer article is a multilayer film.

14. The multilayer article of claim 13, wherein the multilayer film is a biaxially oriented multilayer film.

15. The multilayer article of claim 1, wherein the homogenous material comprises a post-consumer recycle (PCR) material or post-industrial recycle (PIR) material.

16. The multilayer article of claim 1, wherein at least one of the first nanolayer A or the second nanolayer B has a thickness of from 50 nm to 200 nm.

* * * * *